United States Patent [19]

Groff et al.

[11] 4,145,175

[45] Mar. 20, 1979

[54] EXTRUSION APPARATUS

[75] Inventors: James Groff; Stanley Driscoll, both of York, Pa.

[73] Assignee: Keltrol Enterprises, Inc., York, Pa.

[21] Appl. No.: 665,000

[22] Filed: Mar. 8, 1976

[51] Int. Cl.² ............................................. B29F 3/08
[52] U.S. Cl. ............................... 425/377; 264/177 R; 425/379 R; 425/461
[58] Field of Search ............... 425/379 R, 325, 378 R, 425/461, 144, 377; 264/176 R, 177 R

[56] References Cited

U.S. PATENT DOCUMENTS

| | | | |
|---|---|---|---|
| 2,231,281 | 2/1941 | Muller et al. | 425/379 X |
| 2,317,331 | 4/1943 | Mearig | 425/379 X |
| 2,335,308 | 11/1943 | Pendergast et al. | 425/379 |
| 3,119,148 | 1/1964 | Chambers et al. | 425/379 X |
| 3,804,574 | 4/1974 | Gatto | 425/325 X |
| 3,887,319 | 6/1975 | Cottingham | 425/379 R |

*Primary Examiner*—Richard B. Lazarus
*Assistant Examiner*—Mark Rosenbaum
*Attorney, Agent, or Firm*—Weiser, Stapler & Spivak

[57] ABSTRACT

An extrusion apparatus especially suitable for the extrusion of ultra high molecular weight polyethylene comprising an elongated die having internal heating and cooling temperature control units. The die comprises one piece straight through construction and incorporates a chamber that is positioned in longitudinal alignment with the die profile zone. The ratio of cross sectional areas of the chamber and of the die profile zone is substantially one to one. A punch forces the polyethylene through the chamber and into the profile zone of the die wherein the resin is cured and extruded to the desired shape. Internal heating passages and cooling passages are positioned within the die to form a temperature gradient wherein the temperature is greatest at a point intermediate the ends of the die. The travel of the extruded shape is retarded by an adjustable clamp exteriorly of the die.

34 Claims, 4 Drawing Figures

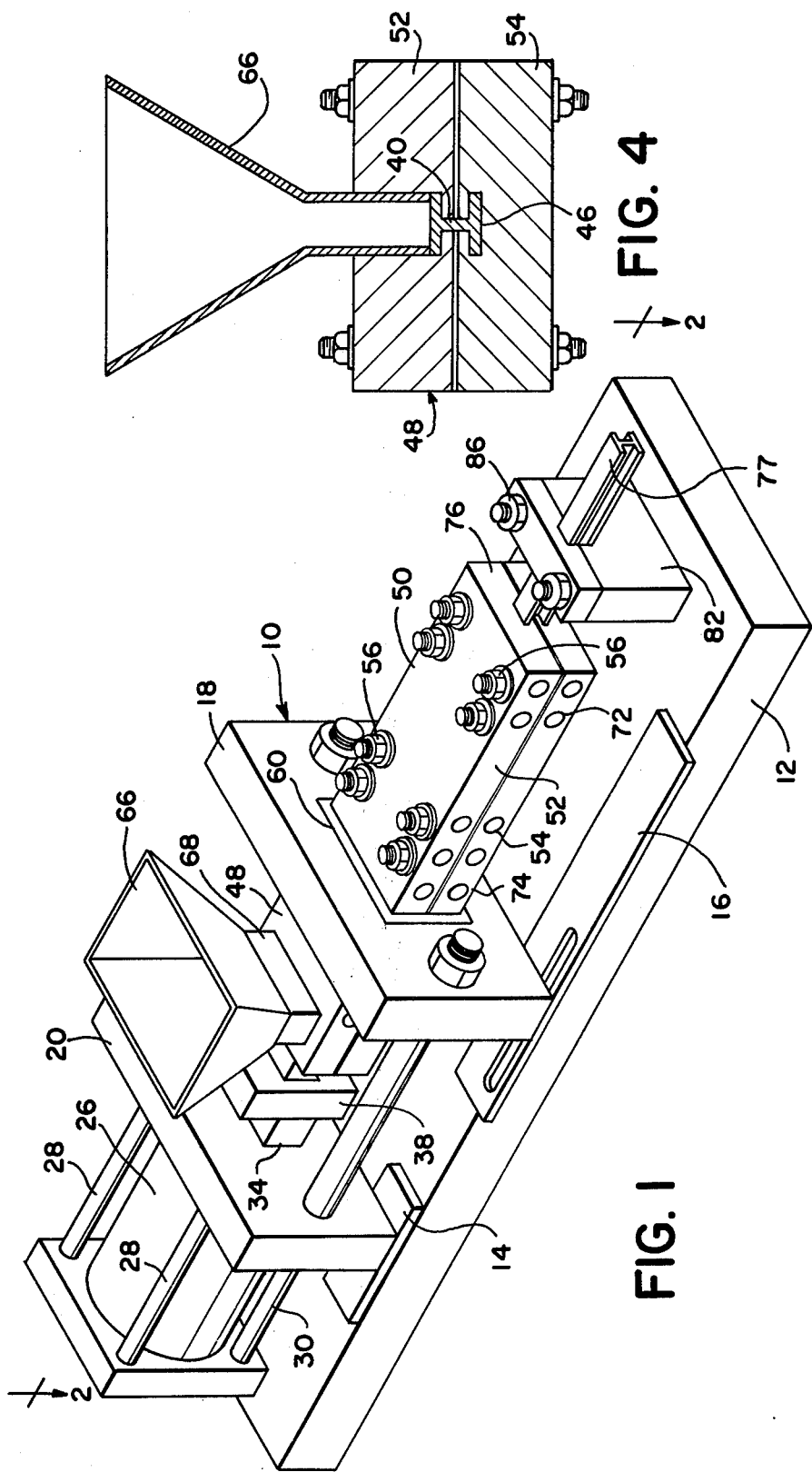

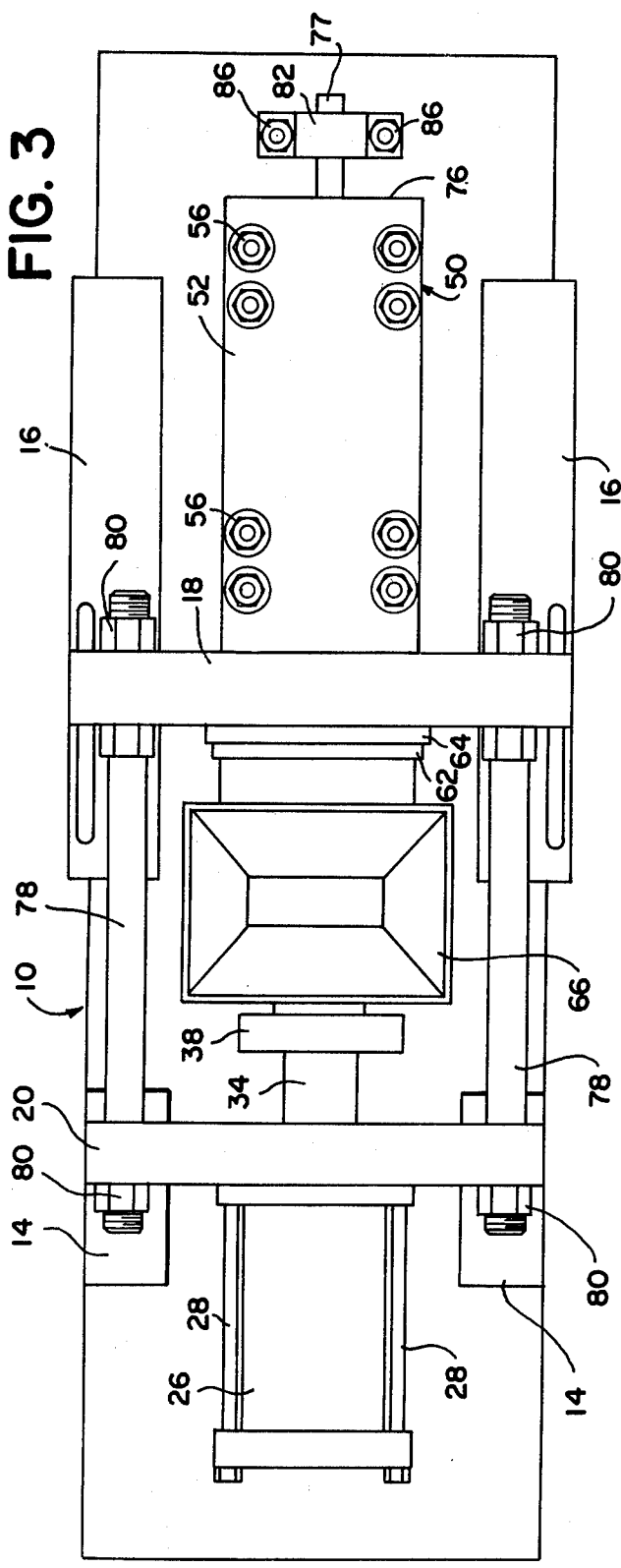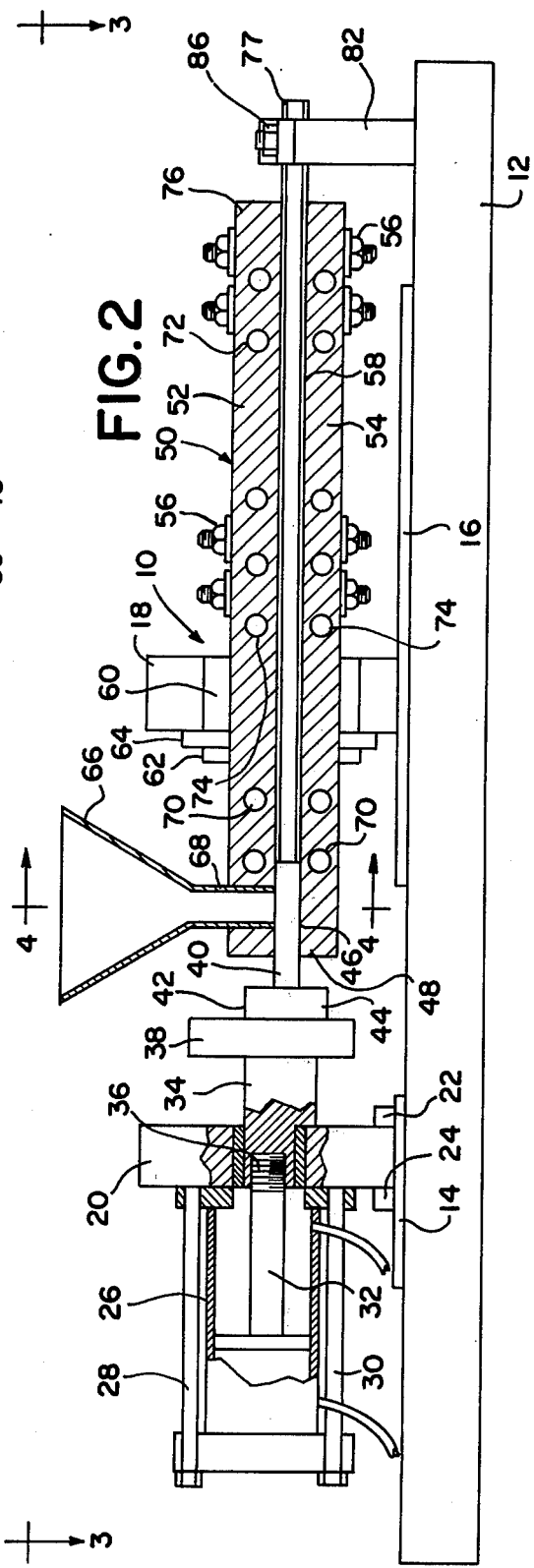

EXTRUSION APPARATUS

BACKGROUND OF THE INVENTION

This invention relates in general to extrusion machinery, and more particularly, is directed to apparatus capable of continuous, rapid extrusion of ultra-high molecular weight polymers.

It is well known to form extrusions by utilizing equipment comprising essentially a ram and die arrangement. Metered portions of the material to be extruded are introduced into a precompression chamber which is positioned in longitudinal alignment with the inlet end of the die. The material to be extruded is contacted in the precompression chamber by the forward strokes of a reciprocating ram which serves to compact the material and to force the compacted material into the bore of the die. Repeated strokes of the ram propels the material through the die in continuous manner to form a continuous shape of a desired profile.

Many types of plastic materials such as polyvinyl chloride plastic, ABS plastic and other plastics have long been extruded in this manner by prior workers in the field. However, plastic materials known as ultra-high molecular weight (UHMW) high density, polyethylene resins have usually resisted prior attempts to form such materials into shaped profiles by utilizing the extrusion process.

Customarily, the precompression chamber ahead of the die has been larger in cross sectional area than the die itself, sometimes being on the order of at least 3 to 1. The pressure generated by the repeated strokes of the ram forces the material to be extruded through a transition area between the comparatively wide precompression chamber ahead of the die and the comparatively narrow profile zone or bore of the die itself. The constriction of the plastic material as it enters the die produces unusually high pressures and usually generates considerable heat. Prior workers have sometimes applied additional heat to the throat section of the die by employing resistance heater bands surrounding the die in sufficient amounts to coact with the heat created by ram pressure to soften sufficiently the material propelled through the die to a point where it tends to flow together into a viscose mass within the die. This mass is then given its desired extrusion shape by the cross-sectional configuration built into the die.

This seemingly simple procedure has proven quite difficult in practice when employing materials such as UHMW high density polyethylene resins. Such resins are sensitive to shear and temperature, particularly, when extrusion pressures approach the value of 50,000 psi. Additionally, in certain materials degradation will occur at approximately 500° F. and dwell time becomes important. Where temperatures are lowered to thereby permit a longer dwell time, uneconomical operation can result.

Prior workers in the field have found that the extrusion of UHMW polyethylene resins have often resulted in defects such as undesirable interior voids, cracks or noticable separations between various charges impelled by repeated strokes of the ram. Sometimes, they have included portions which still exhibited the original powdery or granular structure of the material, having evidently been insufficiently softened in the die. Sometimes they included portions which were not sufficiently polymerized or which were discolored or crystallized.

In other instances, the extrusions were misshapened, or the final dimensions were not held within acceptable tolerances. The foregoing are only illustrative of the wide variety of defects encountered by prior workers when extruding such materials.

U.S. Pat. No. 3,887,319 discloses apparatus for extruding UHMW polyethylene resins. This apparatus attempts to form satisfactory extrusions by employing a precompression chamber, a preheating chamber in front of the entrance to the die and a spreader mounted within the bore of the preheating chamber to assure homogenization of the extrudate. It is stated that the ratio between the dimensions of the preheating chamber and that of the die profile are critical and that this ratio should be on the order of 3 to 1.

All of the prior art extrusion apparatus of which we are familiar employ precompression chambers of cross sectional area that are larger than the cross sectional area of the die bore. A transition section of generally conical configuration is usually employed to direct the molding compound from the precompression chamber into the die under impetus of the ram or other pressure device. U.S. Pat. Nos. 2,747,224, 3,284,372, 3,461,490, 2,770,841, 3,354,501 and British Pat. Specification No. 401,428 all show a tapered transition section between the precompression chamber and the bore of the die. The decrease in size from the precompression chamber to the die results in a considerable increase in required operating pressure and in the generation of heat.

SUMMARY OF THE INVENTION

This invention relates in general to an improved apparatus and process for producing plastic and other extrusions and is particularly applicable to extrusions of ultra high molecular weight polyethylene plastic.

The apparatus of the present invention includes an elongated one piece die having internal cooling means at the inlet and outlet ends thereof. Internal heating means are provided intermediate the ends for heating the extruded materials as they are advanced through the die.

A material hopper feeds particulate UHMW polyethylene resin material through a metering zone which communicates with a precompression chamber. Preferably, the precompression chamber and the die are fabricated of one piece construction and of the same interior bore configuration. Reciprocal strokes of a ram alternately admit material from the hopper into the precompression chamber where it is picked up on the forward strokes of the reciprocating ram. The action of the ram introduces the material into the die and then propels the material through the bore or profile section of the die under pressure. Internal cooling units are positioned at the inlet end of the die to reduce the temperature of the die at the inlet end. Internal heat units are positioned along the body of the die to raise the temperature of the extrudate to a predetermined optimum temperature for the material actually used to aid in the curing process during forming.

The ratio of sizes between the precompression chamber and the die has been designed at 1 to 1 to thereby eliminate any need for a size transition section between the precompression chamber and the die. It has been found that the apparatus of the present invention works extremely well with UHMW polyethylene resins without the need of a spider or other mixing or pressure producing apparatus positioned within the profile zone of the die. In a preferred embodiment, the ram or punch is shaped to conform to the profile configuration of the die. A nozzle clamp can be positioned endwardly of the die to retard the extrudate flow and to maintain the extruded shape to closer tolerances.

The term "unrestricted" as hereinafter employed defines a bore or profile zone that is free of spreaders, mixers, or mechanical mixing elements such as blades, screws, etc.

The words "substantially one to one" as herein employed means that the ratio of cross sectional area of the chamber is approximately equal to the cross sectional area of the die profile zone and not on the order two to one or three to one or more as found necessary by prior workers in the art.

Accordingly, it is a principal object of the present invention to eliminate one or more of the defects which characterized the prior art.

It is another object of the present invention to provide an improved extrusion apparatus which yields products superior to those of the prior art.

It is another object of the present invention to provide a novel extrusion apparatus for use with UHMW polyethylene resins utilizing a one to one ratio between the size of the precompression chamber and the size of the die bore.

It is another object of the present invention to provide a novel extrusion apparatus suitable for use with UHMW polyethylene resin wherein the die employed is a one piece elongated die having internal heating and cooling means.

It is another object of the present invention to provide a novel extrusion apparatus that incorporates an elongated one piece die and precompression chamber construction.

It is another object of the present invention to provide a novel extrusion apparatus wherein the size ratio between the precompression chamber and the die bore is substantially 1 to 1 and wherein there is no size transition section between the precompression chamber and the profile zone of the die.

It is another object of the present invention to provide a novel extrusion apparatus capable of producing satisfactory profiles from UHMW polyethylene resins and which employs no spider or other mixing apparatus placed interiorly of the precompression chamber or of the profile section of the die.

It is another object of the present invention to provide a novel extrusion apparatus having a 1 to 1 ratio between the precompression chamber and the bore of the die and which incorporates a shaped ram or punch, the shape of the ram corresponding to the configuration of the die bore.

It is another object of the present invention to provide a novel extrusion apparatus for extruding UHMW polyethylene resin that is rugged in construction, continuous in operation and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views, and in which:

BRIEF DESCRIPTION OF THE DRAWINGS

FIG. 1 is an isometric view of an extrusion apparatus constructed in accordance with the present invention.

FIG. 2 is a cross sectional view taken along Line 2—2 of FIG. 1, looking in the direction of the arrows.

FIG. 3 is a top plan view of the apparatus looking from Line 3—3 on FIG. 2.

FIG. 4 is a cross sectional view taken along Line 4—4 of FIG. 2, looking in the direction of the arrows.

DESCRIPTION OF THE PREFERRED EMBODIMENT OF THE INVENTION

Although specific terms are used in the following description for the sake of clarity, these terms are intended to refer only to the particular structure of the invention selected for illustration in the drawings and are not intended to define or limit the scope of the invention.

Referring now to the drawings, there is shown in FIGS. 1-3 an extrusion apparatus generally designated 10. A structural steel or other material mounting frame 12 is provided to support the extrusion apparatus in conventional manner. Suitable mounting plates 14, 16 are conventionally affixed to the frame 12 to carry the forward die bolster 18 and the rearward cylinder bolster 20 in a sturdy manner. Shear blocks 22, 24 may be employed in conjunction with the cylinder bolster 20 for shear control purposes in well known manner. In the embodiment illustrated, a hydraulic cylinder 26 mounts upon the cylinder bolster 20 in position to reciprocate its plunger 32 relative to the bolster 20 and is suitably affixed thereto by the upper and lower tie rods 28, 30.

The hydraulic cylinder plunger 32 connects to the punch plate mounting 34 in a suitable, strong connection, such as by a threaded engagement 36. The punch plate mounting unit 34 reciprocally carries the punch mounting plate 38 to which the punch unit 40 is secured by means such as by the mounting blocks 42, 44. Reciprocation of the cylinder plunger 32 upon function of the hydraulic cylinder 26 simultaneously reciprocates the punch unit 40 within the bore 46 of the precompression chamber 48. It will be noted that the punch unit 40 longitudinally aligns with at least a portion of the punch plate mounting unit 34 at the opposite face of the punch mounting 38 to receive all of the forces generated in the hydraulic cylinder 26 in direct alignment.

The die 50 is elongated in design and comprises an upper frame body 52 and a lower frame body 54 which bodies are rigidly secured by a plurality of bolts 56. The die 50 is fabricated in well known manner to form the profile zone 58 of the die to any desired configuration. The chamber or precompression zone 48 is integrally formed in the die 50 and preferably, the bore 46 of the chamber 48 is formed to substantially the same cross sectional shape and cross sectional area as the bore or profile zone 58 of the die 50. It is also within the scope of this invention to fabricate the die profile zone 58 larger in cross sectional area than the chamber bore 46. The die 50 is positioned within the clearance zone 60 of the forward die bolster 18 and is secured therein in well known manner by conventional die mounting blocks 62, 64. The die 50 is elongated in nature and includes in uniform alignment the bore 46 of precompression chamber 48 and the profile zone 58 of the die without any transition element or zone therebetween. It is noteworthy that the cross sectional area of the bore 46 of the chamber 48 is equal to or smaller than the cross sectional area of the profile zone 58 to thereby establish a substantially one to one ratio between the precompression chamber or zone 48 and the compression zone or bore 58 of the die 50.

A material hopper 66 communicates with the chamber 48 through a narrow material metering zone 68 to admit metered quantities of ultra high molecular weight polyethylene into the precompression chamber 48. The UHMW polyethylene charge is granular in nature and will drop by gravity into the precompression chamber bore 46 when the cylinder 26 functions the punch unit or ram 40 to its rearward position.

The die 50 includes a plurality of internal cooling units 70 which may be in the form of hollow passages which are drilled or otherwise provided in the upper and lower frame bodies 52, 54 of the die 50. The internal cooling units 70 connect to a supply of cold water (not shown) and serve to cool the precompression chamber 48 and to shield the chamber 48 from the heating effects of the internal die heating units 74. Additional cooling units 72 which are internally formed in the top frame body 52 and bottom frame body 54 of the die 50 are similar to the cooling units 70 and are formed near the exit zone 76 of the die 50 to cool the extruded profile 77 as it exits the die 50.

As best seen in FIG. 3, the cylinder bolster 20 and the die bolster 18 are securely tied together by the plurality of guide rods 78 which are endwardly secured by the guide rod securing nuts 80 to prevent any undesired movement between the parts during the extrusion process. The heating control units 74 are preferably internally positioned in the die sections 52, 54 to provide greater efficiency in operation. Electrical resistance rods of known construction are employed for die heating purposes at the heat control units 74. Operating temperatures in the 350° F. to 500° F. range are most commonly employed and electrical resistance rods of suitable capacity to generate such temperatures should be employed. Generally speaking, it is the shape and thickness of the part being extruded that determines the operating temperatures. Too much heat can result in discoloration, crystallization or cracks. Too little heat can result in uncured resin in the center of the shape. Usually, heavier sections will require the application of higher temperature to effect full curing.

As above stated, the die 50 of the present invention is elongated in nature and is purposely designed to be considerably longer than prior art dies. Due to the elongated configuration, the resins (UHMW PE) are in process in the die for a longer period of time. This provides for a more uniform heating of the resins and results in three distinct advantages, namely, allows a faster rate of extrusion, provides more uniform curing and results in more uniform size. The elongated bore or profile zone 58 of the die 50 holds the extruded material to the desired shape for a longer period, an improvement that results in less rejections for size discrepancies.

Referring now to FIG. 1, there is illustrated an exteriorly positioned restraint or clamp 82 which is secured to the frame 12 or other fixed construction exteriorly of the exit zone 76 of the die 50. The clamp 82 is formed generally to conform to the shape of the extruded profile 77 and includes adjusting means 86 to vary the clamping pressure. Thus, as the extruded profile 77 exits the die 50 through the exit zone 76, it freely traverses a short distance and then enters the confines of the clamp 82. Pressure is applied at the adjusting means 86 to cause the clamp 82 to act as a restraint or detent to the flow of the extruded product. This restraint causes an external back pressure on the extruded profile 77 which acts to assure that the profile zone 58 of the die 50 completely fills out. The restraint would be particularly useful in completely filling the profile zone 58 in those instances wherein the profile zone 58 is fabricated to a size that is larger than the cross sectional area of the bore 46. Dimensional tolerances are thereby successfully maintained and product rejects are minimized. Other restraint means could also be employed to retard the extrudate flow such as external back pressure means, adjustable means positioned within the profile zone, a travelling plug or arm within the profile zone, or other constructions (all not illustrated).

The apparatus and process of the invention are particularly well suited for the extrusion of ultra high molecular weight polymeric material (UHMW).

The apparatus and process of the invention are ideally suited for the continuous extrusion of preselected shapes from copolyethylene resin, referred to by one skilled in the art as UHMW PE, which polymers can have a broad molecular weight range, generally disclosed in the literature to be in the range in a minimum of 2.5 million to a molecular weight of 6 million. These ultra high molecular weight polymers are described in Modern Plastics, April 1975, pages to 40, and in other literature sources as in U.S. Pat. No. 3,887,319 and such trade pamphlets as that of Hercules, Inc. entitled "Abrasion Resistant 1900 UHMW Polymer" (November, 1972). These publications are incorporated herein by reference.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. In an extrusion apparatus for shaping and extruding ultra-high molecular weight high density polyethylene resin particles into a shaped plastic profile which comprises die means defining a profile zone, a precompression chamber adjacent to the profile zone and defining a shaped bore, feeding means operatively associated with said bore to feed the resin particles into the bore heating means operatively associated with the die means to heat portions of the die means, cooling means associated with the die adapted to cooling portions of the die means, and a ram which acts as a punch unit reciprocated relative to the chamber, the improvement which comprises the bore of the precompression chamber, which chamber is of one piece construction with the die and which bore has a cross sectional area of which is substantially equal to the cross sectional area of the profile zone of the die, and in which bore the resin particles are cold-shaped into the shaped profile, the precompression chamber and the profile zone of the die being without any transitional zone therebetween.

2. The extrusion apparatus of claim 1 wherein the punch unit and the profile zone have substantially the same cross sectional area, so that the repeated strokes of the ram force the plastic material to be extruded from the precompression chamber into the profile zone of the die without constriction, and thereby without generation of heat due to decrease in cross-sectional shape between the chamber and the profile zone.

3. The extrusion apparatus of claim 1 wherein the punch unit and the profile zone have substantially the same cross sectional shape, so that the repeated strokes of the ram force the plastic material to be extruded from the precompression chamber into the profile zone of the die without constriction, and thereby without generation of heat due to decrease in cross-sectional shape between the chamber and the profile zone, and the precompression chamber being without associated heating means to cause softening of the resin particles.

4. The extrusion apparatus of claim 1 wherein the punch unit and the profile zone have substantially the same cross sectional area and the same cross sectional shape.

5. The extrusion apparatus of claim 1 and means for creating an external back pressure on the extruded profile, positioned beyond the exit end of the die means, thereby restraining passage of the profile.

6. The extrusion apparatus of claim 5 wherein the pressure creating means is a clamp.

7. The extrusion apparatus of claim 6 wherein the clamp is adjustable.

8. The extrusion apparatus of claim 6 wherein the clamp is separated from the die means by an air space.

9. The extrusion apparatus of claim 1 wherein the leading edge of the ram is substantially perpendicular to the direction of travel of the ram.

10. The extrusion apparatus of claim 1 in combination with an extruded material, located within the profile zone of the die means, and which is advanced through the profile zone by repeated strokes of the ram, wherein the material being extruded is an ultrahigh molecular weight polymer.

11. The extrusion apparatus of claim 1 which comprises heating means associated with the die and remotely positioned from the precompression chamber.

12. The extrusion apparatus of claim 1 wherein the punch unit and the chamber are operatively associated with each other to contain and preserve shape of the resin particles when cold.

13. The extrusion apparatus of claim 12 wherein the punch unit and die means are operatively associated with each other to contain and shape the particles in heated and solid condition.

14. In an extrusion apparatus for shaping and extruding at low temperature ultra-high molecular weight polyethylene resin subject to sheer and high temperature degradation into preselected shapes and profiles, the combination which comprises:
  a precompression chamber for receiving and shaping the resin, the chamber having a shaped bore;
  feeding means operatively associated with said bore to feed the resin to be extruded into the bore;
  die means adjacent to and associated with the chamber, said die means defining an unrestricted profile zone having an inlet and outlet end, the precompression chamber being integrally formed in the die, said profile zone being not smaller in cross sectional area than the cross sectional area of the bore and the profile zone being operatively associated with the precompression chamber to receive the so-shaped resin and polymerize and cure it into the so-shaped resin;
  and the precompression chamber and the profile zone being free of transitional zone therebetween, whereby the resin is fed from the precompression chamber into the profile zone of the die without generating high pressure and heat due to decrease in size in the transitional area between the precompression chamber and the die;
  first cooling means associated with the die and adapted and positioned to cool the end of the die means nearest the precompression chamber and;
  second cooling means associated with the die and adapted and positioned to cool the end of the die means furthest remote the precompression chamber and adapted to cool the extruded profile as it exists the die, heating means associated with the die to heat the profile zone of the die in a position intermediate the two cooling means, and
  a punch unit reciprocal within the bore of the chamber to compress the resin material deposited into the bore and to force the resin material under pressure in solid, non-liquified state through the bore and profile zone of the die to form a cured, extruded profile free of heat and pressure sheering defects.

15. The extrusion apparatus of claim 14 wherein the bore is unrestricted.

16. The extrusion apparatus of claim 14 wherein the profile zone is unrestricted.

17. The extrusion apparatus of claim 14 wherein the bore and the profile zone are unrestricted.

18. The extrusion apparatus of claim 14 and clamp means positioned beyond the exit end of the die means to restrain the passage of the extruded product.

19. The extrusion apparatus of claim 18 wherein the clamp means are adjustable.

20. The extrusion apparatus of claim 18 wherein the clamp means are separated from the die means by an air space.

21. The extrusion apparatus of claim 14 wherein the leading edge of the ram is substantially perpendicular to the direction of travel of the ram.

22. The extrusion apparatus of claim 8 in combination with an extruded material, located within the profile zone of the die means, and which is advanced through the profile zone by repeated strokes of the ram, wherein the material being extruded is an ultrahigh molecular weight polymer.

23. The extrusion apparatus of claim 14 wherein the first cooling means, the heating means, and the second cooling means are internal to the die.

24. The extrusion apparatus of claim 14 wherein the regions of the die which contain the first cooling means, the heating means, and the second cooling means are integrally connected to each other and the chamber.

25. The extrusion apparatus of claim 14 wherein the shaped bore is adapted in size to allow the punch unit to travel therewithin and for the punch to force under pressure and to shape the solid, resin within the bore.

26. The extrusion apparatus of claim 25 wherein the punch unit is adapted to travel through at least part of the cooled inlet end of the profile zone of the die means where the resin particles are cold-shaped.

27. The extrusion apparatus of claim 25 wherein the punch unit is adapted not to travel through the heated zone of the profile of the die.

28. The extrusion apparatus according to claim 25 wherein the puch unit is operatively associated with the bore to force solid, unsintered material particles in the desired direction within the bore.

29. In an extrusion apparatus for shaping and extruding ultra-high molecular weight polyethylene resin subject to sheer and high temperature degration, the extrusion being without the high pressure and heat caused by pressure generated by repeated strokes of a ram forcing the resin to be extruded through a transition area between a wide precompression chamber positioned ahead of a die and the narrower profile zone of the die itself, into preselected shapes and profiles free of heat and pressure sheering defects, the combination which comprises:
- a precompression chamber having a shaped bore for receiving the particulate resin in cool, unheated, solid state;
- means operatively associated with said bore to feed the resin material to be extruded into the bore;
- die means adjacent to and associated with the chamber, said die means defining an unrestricted profile zone having an inlet and outlet end, the precompression chamber being integrally formed in the die, said profile zone being not smaller in cross sectional area than the cross sectional area of the bore;
- and the precompression chamber and the profile zone being free of transitional zone therebetween, whereby the resin is fed from the precompression chamber into the profile zone of the die without generating high pressure and heat due to decrease in size in the transitional area between the precompression chamber and the die;
- first cooling means associated with the die and adapted and positioned to cool the inlet end of the die means nearest the precompression chamber;
- second cooling means associated with the die and adapted and positioned to cool the outlet end of the die means at a position furthest remote the precompression chamber;
- heating means adapted to heat portions of the die means in the curing process and positioned intermediate the cooling means;
- a punch unit associated with and reciprocal within the bore of the chamber to compress the resin particulate material deposited into the bore and to force the resin material under pressure in solid, non-melted state through the bore, thereby shaping the solid particles into the desired profile and the profile zone to form a cured, extruded profile free of heat and pressure sheering defects; and
- whereby, the punch unit reciprocating within the bore of the chamber forces the plastic material to be extruded from the precompression chamber into the profile zone of the die without constriction, and thereby without generation of heat due to decrease in cross-sectional shape between the chamber and the profile zone.

30. The extrusion apparatus of claim 29 wherein the leading edge of the ram is substantially perpendicular to the direction of travel of the ram.

31. The extrusion apparatus of claim 29 in combination with an extruded material, located within the profile zone of the die means, and which is advanced through the profile zone by repeated strokes of the ram, wherein the material being extruded is an ultrahigh molecular weight polymer.

32. The extrusion apparatus of claim 29 wherein the first cooling means, the heating means, and the second cooling means are internal to the die.

33. The extrusion apparatus of claim 29 wherein the regions of the die which contain the first cooling means, the heating means, and the second cooling means are integrally connected to each other and to the chamber.

34. In an extrusion apparatus for shaping and extruding a synthetic plastic consisting of an ultra-high molecular weight polyethylene resin, subject to sheer and high temperature degration, the extrusion being without the high pressure and heat caused by pressure generated by repeated strokes of a ram forcing the resin to be extruded through a transition area between a wide precompression chamber positioned ahead of a die and the narrower profile zone of the die itself, into preselected shapes and profiles free of heat and pressure sheering defects, the combination which comprises:
- a precompression chamber having a shaped bore for receiving and shaping the particulate resin in cool, unheated, solid state;
- feeding means operatively associated with said bore to feed the resin material to be extruded into the bore;
- die means adjacent to and associated with the chamber, said die means defining an unrestricted profile zone having an inlet and outlet end, the precompression chamber being integrally formed in the die, said profile zone being not smaller in cross sectional area than the cross sectional area of the bore and the profile zone being operatively connected to the die means to receive the so-shaped resin and polymerize and cure it into the so-shaped resin;
- and the precompression chamber and the profile zone being free of a transitional zone therebetween, whereby the resin is fed from the precompression chamber into the profile zone of the die without generating high pressure and heat due to decrease in size in the transitional area between the precompression chamber and the die;
- first cooling means internal to the die and integrally connected to the chamber, adapted and positioned to cool the end of the die means nearest the precompression chamber;
- second cooling means internal to the die, adapted and positioned to cool the end of the die means furthest remote from the precompression chamber and adapted to cool the extruded profile as it exits the die; and
- heating means internal to the die and adapted to heat the profile zone of the die, in a position intermediate the two cooling means;
- the second cooling means and the heating means being integrally conected to each other and the heating means being integrally connected to the first cooling means; and
- a punch unit associated with and reciprocal within the bore of the chamber to compress the resin material deposited into the bore and to force the resin material under pressure in solid, non-melted state through the bore, thereby shaping the solid particles into the desired profile, and the profile zone of the die, to form a cured, extruded profile free of heat and pressure sheering defects, the punch unit having a ram, the leading edge of which is substantially perpendicular to the direction of travel of the ram,
- whereby, the punch unit reciprocating within the bore of the chamber forces the plastic material to be extruded from the precompression chamber into the profile zone of the die without constriction, and thereby without generation of heat due to decrease in cross-sectional shape between the chamber and the profile zone.

* * * * *